No. 713,677. Patented Nov. 18, 1902.
J. S. PECK.
SYSTEM OF ELECTRIC DISTRIBUTION.
(Application filed Mar. 21, 1902.)
(No Model.)
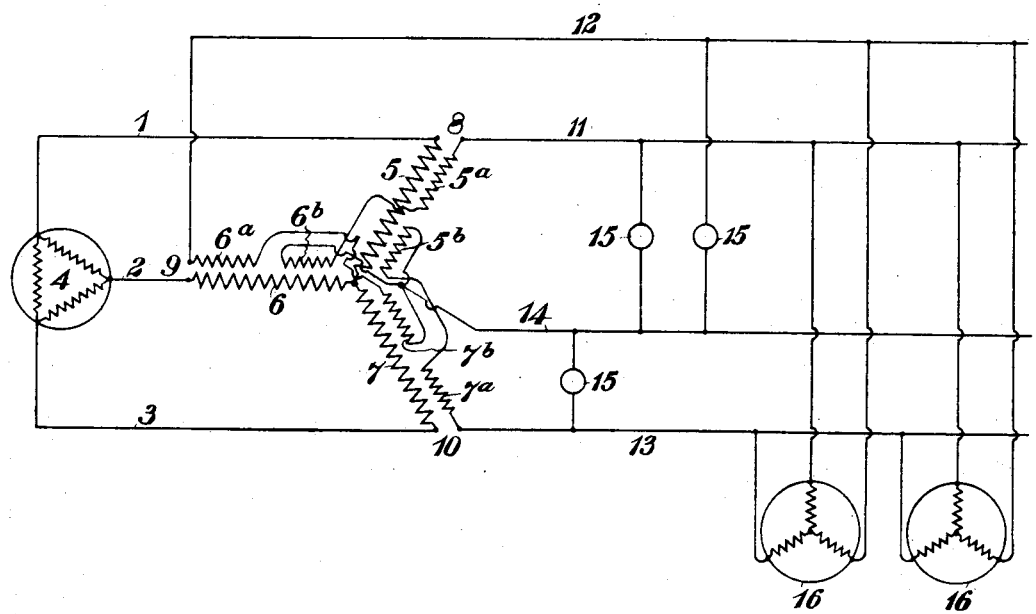
WITNESSES:
C. L. Belcher
Birney Hines
INVENTOR
John S. Peck
BY
Kerley G. Carr
ATTORNEY

UNITED STATES PATENT OFFICE.

JOHN S. PECK, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC DISTRIBUTION.

SPECIFICATION forming part of Letters Patent No. 713,677, dated November 18, 1902.

Application filed March 21, 1902. Serial No. 99,245. (No model.)

*To all whom it may concern:*

Be it known that I, JOHN S. PECK, a citizen of the United States, residing in Pittsburg, in the county of Allegheny and State of Pennsylvania, have invented a new and useful Improvement in Systems of Electrical Distribution, (Case No. 1,042,) of which the following is a specification.

My invention relates to systems of electrical distribution, and particularly to such systems as involve the distribution of energy from three star-connected transformers by means of four conductors.

The object of my invention is to provide a system which involves transformation of three-phase currents by means of star-connected transformers of either the auto or two-circuit type and distribution of the transformed energy by means of four wires in such manner as to insure satisfactory operation of each of the single circuits, either alone or in conjunction with the others and with the three-phase circuit.

It has heretofore been proposed to transform three-phase energy by means of interconnected transformers and to distribute the same by means of four wires, the fourth or neutral wire being one side of each of three single-phase circuits. With such an arrangement when the secondary windings of the transformers are disposed in the usual manner and connected in star no single circuit can be used alone for the operation of its translating devices, for the reason that there is no corresponding circuit through the primary windings of the transformers. By means of my invention, however, it is possible to utilize each of the single-phase circuits and the three-phase circuit, either separately or at the same time, without impairing the efficiency of the system.

My invention is illustrated in the accompanying drawing, the single figure of which is a diagram of the distribution system.

As shown, three-phase currents are supplied to three conductors 1 2 3 directly from a generator 4; but it is within my invention to supply the currents from a plurality of generators operating in parallel and also through step-up transformers, provided the generator electromotive force is not as high as may be desired for transmission purposes. The conductors 1, 2, and 3 are respectively connected to the outer terminals of three primary windings 5, 6, and 7 of three transformers 8, 9, and 10, the inner terminals of the windings 5, 6, and 7 being connected together, thus forming what is known as "star-connected" windings. According to the usual construction of transformers for either three or four wire distribution the secondaries would be connected in the same manner as the primaries 5, 6, and 7 are connected, and the fourth or neutral conductor would be joined to the middle or common connection of all of the secondaries. This arrangement is feasible and satisfactorily operative in cases where the utilization of secondary circuits is such as to insure corresponding primary circuits and a consequent electrical balance in the transformers. In case it is desired, however, to utilize one of the single-phase circuits only such a system is impracticable, for the reason that there is no complete primary circuit corresponding to the secondary circuit which supplies the translating devices, and therefore no appreciable amount of energy will flow. In order to overcome this difficulty, and thus make it possible to utilize efficiently not only the three-phase circuit, but each of the single-phase circuits, either alone or in conjunction with the others, I provide each of the transformers with two secondary windings of substantially the same length, the transformer 8 being provided with secondary windings $5^a$ and $5^b$, the transformer 9 with secondary windings $6^a$ and $6^b$, and the transformer 10 with secondary windings $7^a$ and $7^b$. These windings are interconnected, so that the current at any given instant through the two secondaries of each of the transformers with reference to the neutral conductor will be in opposite directions, the particular connections shown being as follows: The outer terminals of windings $5^a$, $6^a$, and $7^a$ are respectively connected to the distributing-conductors 11, 12, and 13. The inner terminals of secondary windings $5^a$ and $6^b$ are connected together. The inner terminals of secondary windings $6^a$ and $7^b$ are connected together, and the inner terminals of windings 5ᵇ and 7ᵃ are connected together. The outer terminals of windings 5ᵇ, 6ᵇ, and 7ᵇ are all connected together and to the neutral conductor 14 of the system.

As indicated, the single-phase translating device 15 may be connected across each of the circuits 11 14, 12 14, and 13 14. A suitable three-phase translating device 16 may be connected across the three-phase circuit 11 12 13.

It will be understood that both the three-phase translating devices and the single-phase translating devices may be operated either at the same time or independently, and in case only one of the single-phase circuits is utilized—as, for example, the circuit 13 14—the secondary windings of the transformer corresponding to this circuit belong to two of the star-connected transformers—that is to say, in the specific case just mentioned the secondary windings 5ᵇ and 7ᵃ will provide the energy for the translating device or devices—and since the former of these is a secondary to the primary winding 5 of transformer 8 and the other is a secondary to the primary winding 7 of transformer 10 there is a balanced condition of circuits, and therefore a flow of current from the generator through conductors 3 and 1 and the transformer primaries 7 and 5. It will be also understood that as many sets of interconnected transformers may be employed as may be safely supplied from the transmission-circuits.

The invention is not necessarily restricted to the specific connections indicated in the drawing, it being satisfied by such an arrangement and interconnection of windings that each single-phase circuit pertains to more than one of the star-connected transformers, whereby a balanced condition of the circuits which will permit of satisfactory operation is insured.

It is to be further understood, as has been already suggested, that the interconnected windings which are here shown as secondaries to separate primary windings may constitute the sole windings of the transformers and be therefore both primaries and secondaries when properly connected to the external conductors.

I claim as my invention—

1. The combination with a four-wire, three-phase alternating-current circuit, of three star-connected transformers each of which has two like windings only for connection to said four-wire circuit and being reversely connected thereto.

2. In an alternating-current system of distribution, the combination with four distributing-conductors, of three transformers having star-connected primary windings and each having two secondary windings only which are of substantially the same length and are reversely connected to one of said distributing-conductors.

3. In an alternating-current system of distribution, three transformers each of which has two windings of substantially the same length, one of the windings of each transformer having its respective terminals connected to an external conductor of the system and to one of the terminals of the second winding of one of the other transformers, the other terminals of the second windings being all connected to a fourth external conductor of the system.

4. In an alternating-current system of electrical distribution, three transformers having primary windings connected in star to a source of three-phase energy and severally provided with two secondary windings, the corresponding windings constituting one set being connected together and to the neutral conductor of the system and the windings constituting the other set being respectively connected between an external conductor and the winding on an adjacent transformer that pertains to the other set so that the windings on each transformer are reversed with reference to the neutral conductor of the system.

5. In an alternating-current system of distribution, three transformers each of which has two windings in combination with four external conductors one of which is connected to each of the others through two windings in series, said two windings pertaining to different transformers and being so connected that the windings of each transformer are reversely connected in circuit.

In testimony whereof I have hereunto subscribed my name this 18th day of March, 1902.

JOHN S. PECK.

Witnesses:
  JAMES B. YOUNG,
  WESLEY G. CARR.